May 31, 1955
D. A. McLEAN ET AL
2,709,663
ELECTRICAL CAPACITORS
Filed June 15, 1950
3 Sheets-Sheet 1
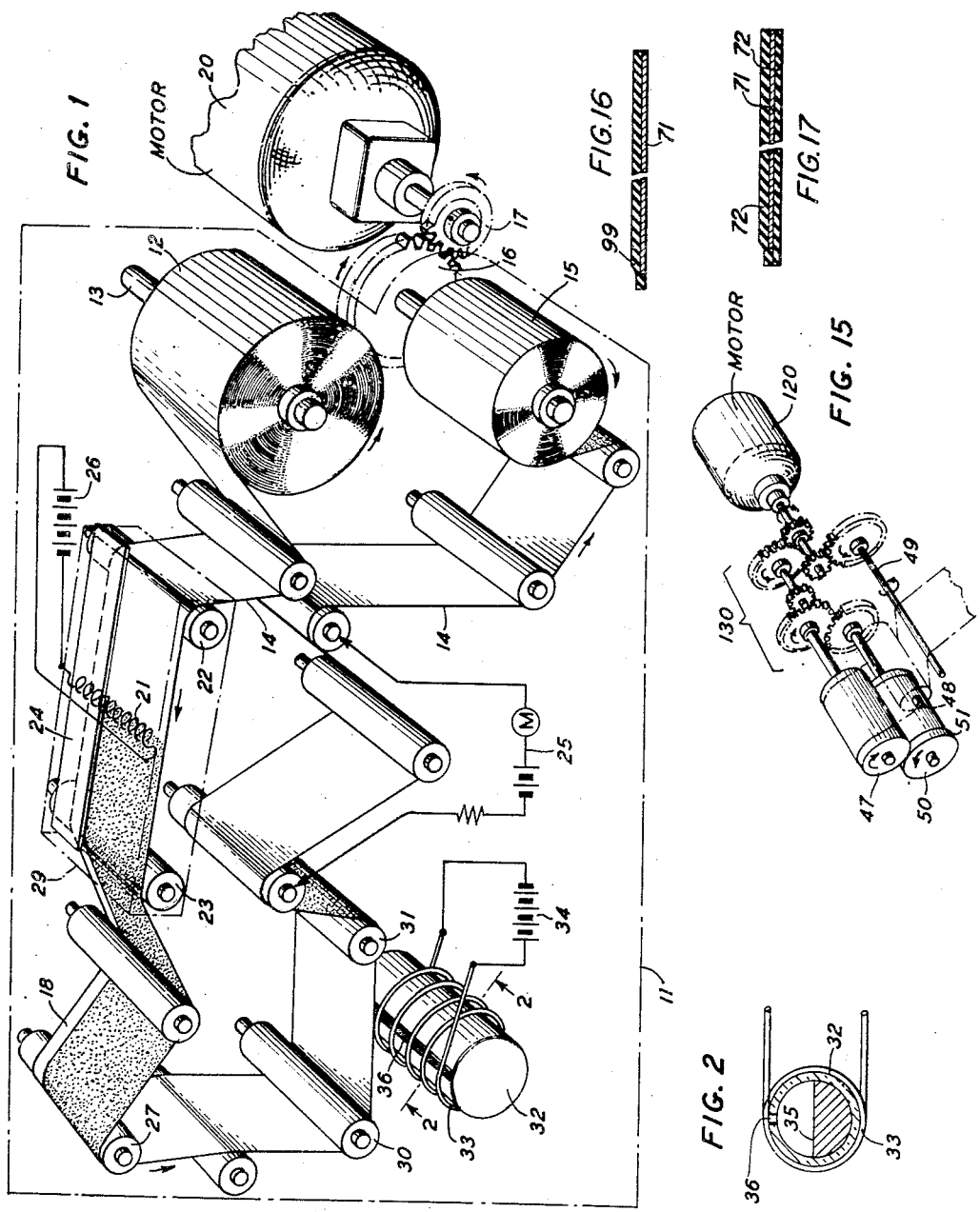
INVENTORS D. A. McLEAN
H. G. WEHE
BY
*D. MacKenzie*
AGENT INVENTORS D. A. McLEAN
H. G. WEHE
BY
S. MacKenzie
AGENT

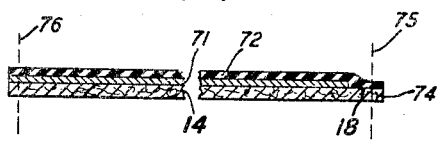
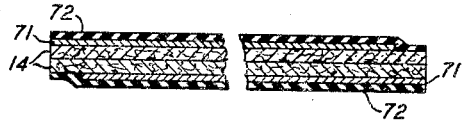
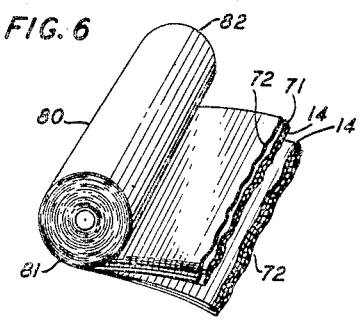
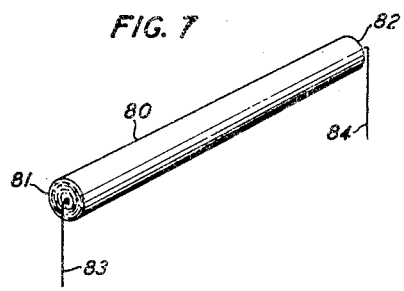
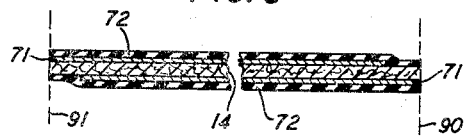
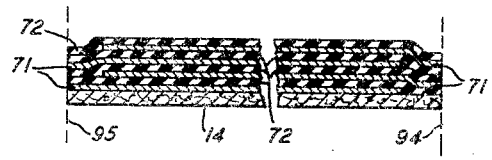
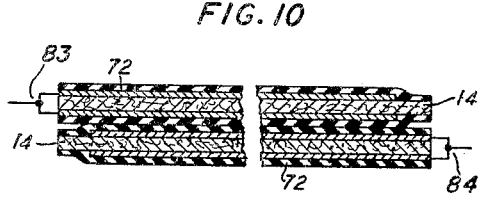
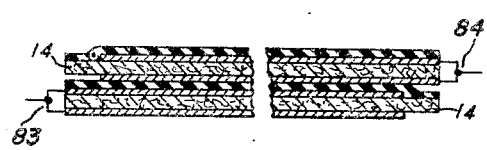
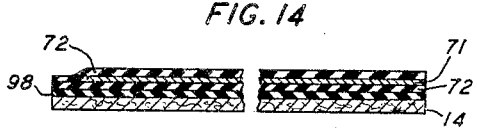

United States Patent Office 2,709,663
Patented May 31, 1955

2,709,663

ELECTRICAL CAPACITORS

David A. McLean, Chatham, and Herman G. Wehe, Summit, N. J., assignors to Bell Telephone Laboratories, Incorporated, New York, N. Y., a corporation of New York Application June 15, 1950, Serial No. 168,198

3 Claims. (Cl. 117—71)

This invention relates to electrical capacitors and methods of making the same and especially of such capacitors wherein the dielectrics are thin films of lacquer and the electrodes are thin films of metal.

An object of the invention is to provide high quality electrical capacitors of very much smaller volume per unit of capacity than any such (other than electrolytic) hitherto available.

Another object is to provide a method of producing at a rapid rate extended capacitor strips composed of alternating films of lacquer dielectric and metal electrode, appropriate to be rolled up into finished capacitors of any desired capacitance.

The method of the invention comprises, generally speaking, a vaporizing step depositing a very thin electrically conducting film on a supporting strip, followed by a roller coating step applying over the conducting film a thin film of liquid lacquer or equivalent dielectric material.

If the supporting strip is paper, for example, there is first vaporized upon its surface a film of metal, such as silver, of extreme thinness, upon which is then vaporized, in a film of suitable thickness, the metal electrode. The electrode metal may be zinc, for example, which requires the intermediate silver layer to make it adhere to the paper. It is probable that the zinc and silver layers coalesce into a single layer of zinc-silver alloy. Over this composite layer, the roller coating step deposits a film of lacquer (consisting of a normally solid dielectric material in solution) of desired thickness and the subsequent drying of the dielectric layer results in a capacitor strip suitable for rolling up in conventional manner. In the figures and in the following description, the composite metallic layer will be treated as a single layer.

The thinness of dielectric and the smallness of capacitors used for many low voltage usages is limited by the thickness of the thinnest available self-supporting film which can be produced commercially. The production of metallized paper capacitors has improved this situation by making it possible to use a single layer dielectric. However, it is still true that for the lowest voltage applications, the thinnest commercially available self-supporting dielectric films that can be wound on mandrels, impregnated, and carried through other required manufacturing operations are several times as thick as required for electrical reasons. Since the volume of dielectric required to provide a given capacitance varies as the square of the thickness of the dielectric, it can be seen that this procedure is very uneconomical of space and weight. The present invention overcomes this difficulty by making it possible to adjust the thickness of the dielectric to meet the electrical requirements.

The conducting films used in capacitors produced by the method of this invention may range from 100 to 10,000 angstroms in thickness with the preferred range between 200 and 1000 angstroms. The dielectric thickness may range from about 0.03 to 0.3 mil. The metal can be vaporized on a supporting strip at about 300 feet per minute, and the liquid lacquer can be applied by a roller coater at about 100 feet per minute.

An important feature of the present invention is that it makes it possible to take advantage of important characteristics of particular dielectric materials which are either not available in film form or are available only in films too thick to allow them to be used efficiently in capacitors. For example, polystyrene has been used for the dielectric of capacitors; it has desirable characteristics including low "soak" or residual charge, high insulation resistance, low power factor, low temperature coefficient of capacitance, and stability of capacitance with time or service. However, a disadvantage in its use has been that so far it has not been capable of manufacture in self-supporting films thinner than about 0.6 to 1.0 mil. Capacitors built up of alternate layers of metal foils and strips of 0.6 to 1.0 mil polystyrene, or even of such polystyrene strips with metal vaporized thereon, are comparatively bulky. Capacitors in accordance with this invention in which a very thin film of polystyrene is applied by the roller coating process are very much smaller than any capacitors of the same capacity which are wound or laid up using self-supporting dielectric materials.

Another feature of the invention is that by its use one form of capacitor can be made with the supporting strip of paper or other supporting structure not forming a part of the electrical components of the capacitor. Consequently, the supporting structure for this form of capacitor can be of material of poor dielectric quality.

Still another feature is that capacitor strips can be built up on a supporting structure, and this supporting structure can be removed, leaving a self-supporting capacitor structure. Such a self-supporting structure is capable of being wound on a mandrel and taken through the usual steps of the processes of manufacture which conventional capacitor paper undergoes in the manufacture of capacitors. This feature is realized by applying a temporary film of lacquer on the supporting structure and building up the capacitor on this lacquer film, after which this lacquer film is dissolved to separate the support from the capacitor. For best results, the temporary layer should be soluble in a solvent or solvents which will not attack the capacitor structure.

A further feature of this invention is the production of capacitors of the self-healing type as the result of depositing the metal conducting films by vaporization.

Yet another feature is that this invention permits making use of very thin films of plastic materials, which can be deposited from solution in much better form than paper can be given when deposited from suspension in the usual manner.

A still further feature is the production of capacitors which retain very little residual charge; this is the result of the type of dielectric material used as the base of the lacquer.

The nature of the present invention will be more fully understood from a consideration of the embodiments of the products of the method illustrated in the accompanying drawings in which:

Fig. 1 is a perspective schematic view of the apparatus for vaporizing metal on a strip of paper;

Fig. 2 is a cross-sectional view of the device for vaporizing zinc, which is shown in the lower left-hand portion of Fig. 1;

Fig. 4 is a magnified cross-sectional view of a strip of paper on which a composite metal coating has been vaporized in two steps and a film of normally solid dielectric material has been applied from solution by roller coating over the metal coating in accordance with the method of this invention;

Fig. 5 is a magnified cross-sectional view showing two strips, such as shown in Fig. 4, placed back to back ready for rolling up into cylindrical form after their edges have been trimmed;

Fig. 6 is a magnified perspective view showing the two strips of Fig. 5 in the process of being rolled up to form a cylindrical capacitor;

Fig. 7 is a perspective view of a completed capacitor, such as shown in Fig. 6, after the ends of the cylinder have been coated with a conducting layer as by the "Schoop" process and terminal wires have been attached to the coated ends;

Fig. 8 is a magnified cross-sectional view of a capacitor strip with coatings such as shown in Fig. 4 applied first on one side of a paper strip and then on the reverse side;

Fig. 9 is a magnified cross-sectional view of a capacitor strip composed of successive alternate layers of vaporized metal coatings and films of dielectric material on a single strip of paper;

Fig. 10 is a magnified cross-sectional view of two capacitor strips laid back to back, each strip having vaporized metal and lacquer roller coated on both sides of the supporting strip but with the vaporized metal coatings on both sides extending to the same edge;

Fig. 11 is a magnified cross-sectional view of two capacitor strips laid back to back for forming a capacitor, each strip having a vaporized metal coating on both sides of the supporting strip and with the vaporized metal coatings on both sides extending to the same edge of the supporting strip but with roller coated lacquer on only one of these metal coatings;

Fig. 12 is a magnified cross-sectional view of a capacitor strip with a vaporized metal coating on the supporting strip, lacquer roller coated over the metal coating, and a second vaporized metal coating over the lacquer coating;

Fig. 13 is a magnified cross-sectional view of a capacitor strip with a soluble coating on the supporting strip, a vaporized metal coating on the soluble coating, and roller coated lacquer over the metal coating;

Fig. 14 is a magnified cross-sectional view of a capacitor strip with a soluble coating on the supporting strip, roller coated lacquer over the soluble coating, a vaporized metal coating over the lacquer coating and a roller coated lacquer coating over the metal coating;

Fig. 15 is a perspective view, to a reduced scale, of the motor and gearing for driving the rollers in the mechanism for roller coating capacitor strips shown in Fig. 3;

Fig. 16 is a magnified cross-sectional view of the capacitor strip of Fig. 13 with the support strip removed after the soluble parting layer has been dissolved; and Fig. 17 is a magnified cross-sectional view of the capacitor strip of Fig. 14 with the support strip removed after the soluble parting layer has been dissolved.

Figure 3:
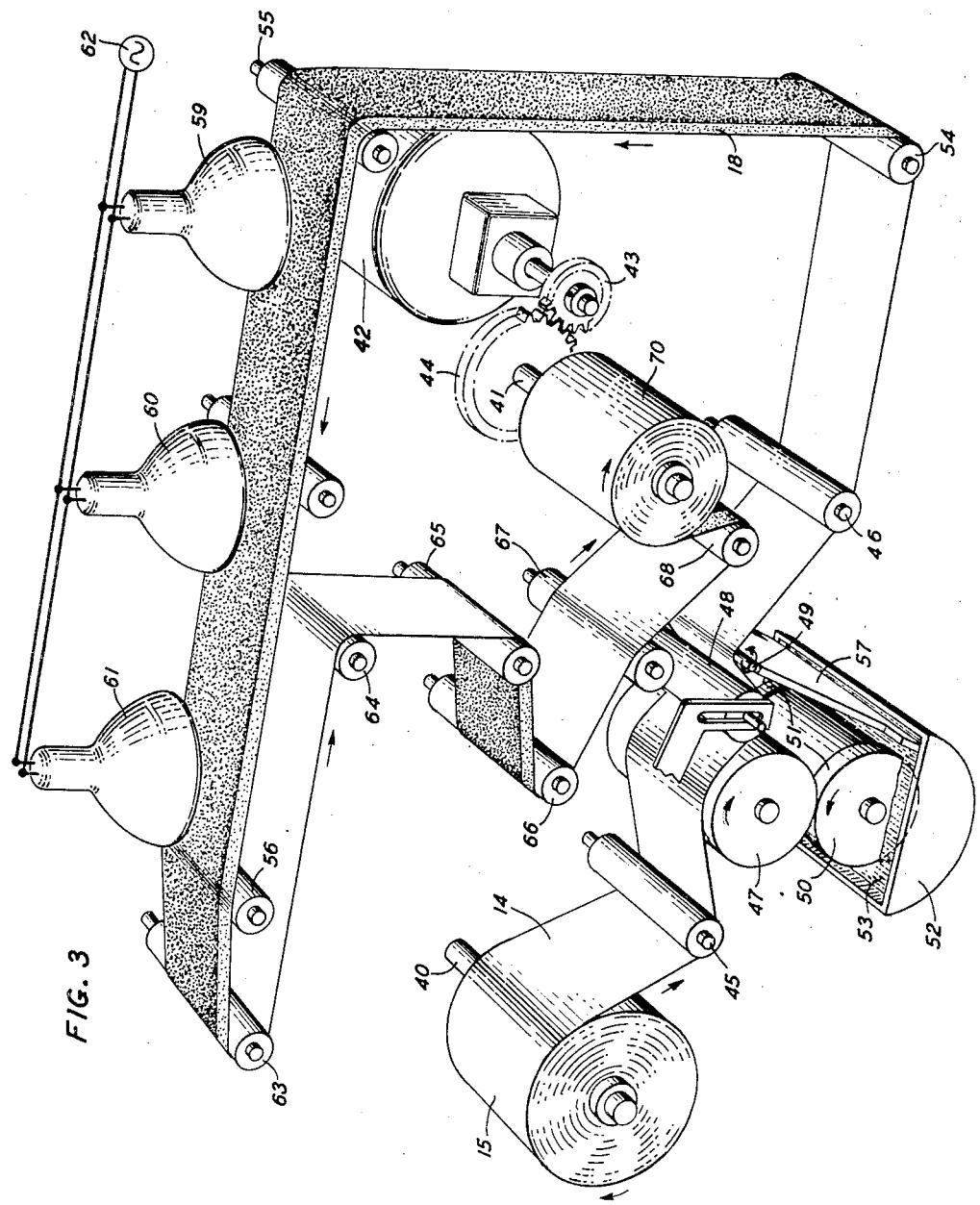
Fig. 3 is a perspective schematic view of the apparatus for applying from solution a normally solid dielectric material to a strip of paper with a roller and solidifying the resulting film of dielectric material.

Referring now to the drawings, in Fig. 1, the apparatus for vaporizing metal onto a strip of paper is shown encased in a vacuum housing 11. A roll 12 of paper or other suitable supporting material is mounted to rotate on a mandrel 13. The paper strip 14, under uniform tension provided by a brake (not shown), passes over a series of mandrels and, after it is coated with metal, is wound up in a roll 15, driven through a pair of gears 16, 17 by motor 20, preferably outside of the vacuum housing.

A coil of molybdenum wire 21 extends across the face of paper strip 14 between mandrels 22, 23. A mask 24 is mounted to extend between mandrels 22, 23 and over the surface of paper strip 14 for a short distance from one edge thereof, between coil 21 and strip 14. Coil 21 is loaded with silver and is heated by battery 26 to give off silver vapor deposited on the surface of paper strip 14 across the entire face thereof except along the edge 18, where mask 24 prevents the silver vapor reaching the surface of strip 14. The silver deposit thus forms a very thin coating on the strip 14 (except on portion 18 thereof) as the strip moves under coil 21. A housing 29 covers strip 14, coil 21, and mask 24 and extends between mandrels 22 and 23 to confine the silver vapor.

Strip 14 moves onward over mandrel 27, under mandrel 30 to mandrel 31 and over and under other mandrels to reach roll 15. In passing from mandrel 30 to mandrel 31, the under side of paper strip 14 with its silver coating passes horizontally and above zinc vaporizing pot 32, which is surrounded by a wire coil 33 heated by battery 34. Zinc 35 (Fig. 2) is vaporized in pot 32, and vapor from the zinc rises through slot 36 to strike the under side of paper strip 14, where it adheres only to the coating of silver on strip 14 and does not adhere to the edge portion 18 thereof shielded by mask 24. Fig. 2 is a cross-section of pot 32 at the plane 2—2, Fig. 1.

At a convenient point after strip 14 leaves mandrel 31, the electrical resistance of the silver-zinc coating is measured in any suitable manner, say in the circuit 25. The resistance is controlled by varying the speed of travel of strip 14 and the silver and zinc evaporation rates.

Although deposition in vacuum is the preferred method of applying the metal coatings, alternatively one may use the method described in Patent 2,503,571 to H. G. Wehe, granted April 11, 1950, "Apparatus for Coating Surfaces by Thermal Vaporization at Atmospheric Pressure."

After strip forming roll 15 has received the silver-zinc coating throughout its length, it is transferred to the lacquer coating apparatus of Fig. 3, where it is mounted on mandrel 40. Strip 14, under uniform tension provided by a light brake (not shown), is threaded under and over a series of mandrels to take-up mandrel 41 driven by motor 42 through gears 43, 44. Between mandrels 45 and 46, strip 14 passes over roller 47, of axial length somewhat greater than the width of the strip, under a floating roller 48 and over scraper roller 49. The metal coated side of strip 14 is in contact with roller 47 which itself bears upon the end portions 51 of roller 50. Between these portions, roller 50 is undercut to a uniform diameter slightly less than that of the end portions, which themselves are of the same diameter as roller 47.

Rollers 47 and 50 are driven together, by a motor and gearing as shown in Fig. 15, to revolve in opposite senses, as shown. Below roller 50 is supported tray 52 containing a solution 53 of normally solid dielectric material. A suitable solution is that of cellulose acetate butyrate in methyl acetate. The surface of roller 50 picks up from tray 52 a portion of solution 53 which it applies to the surface of roller 47 within the limits of the undercut portion of roller 50. The solution thus applied to roller 47 is thereupon applied as a coating over nearly the entire width of strip 14, including the shielded strip 18, leaving a narrow margin at each edge of strip 14 to avoid bead formation.

Scraper roller 49, driven by a motor shown in Fig. 15, revolves in a groove in drain board 57 in a sense opposite to the direction of travel of strip 14. Thus, excess solution is removed from the strip and carried off by board 57 to return to tray 52. Contact between strip 14 and roller 47 is made uniform across the width of the strip by the weight of roller 48.

The paper strip 14 with the coating of dissolved dielectric material passes over mandrels 54, 55, 56. During this travel some of the solvent is lost to the surrounding air. Between mandrel 55 and mandrel 56 strip 14 passes below a plurality of heating lamps 59, 60, 61, which may for example be of the infra-red type, heated from a power source 62. In passing between mandrels 55 and 56 paper strip 14 has the coating of dielectric material exposed to the rays of lamps 59, 60, 61 which substantially complete the removal of solvent, leaving the layer of solid dielectric material. Paper strip 14 then travels around other mandrels 63, 64, 65, 66, 67, 68 and is wound up in a roll 70.

The coated paper strip 14, after the drying and hardening of the coating of dielectric material on it, has a cross-section as shown in Fig. 4 in which the silver-zinc coating 71 is above the surface of paper strip 14, and the dielectric material coating 72 is on top of coating 71 and also extends to edge 74 of paper strip 14 adjacent the unsilvered portion 18. Fig. 4 is a magnified view of the coated paper strip 14 and, as hereinbefore mentioned, the silver of coating 71 is of extreme thinness. The zinc of coating 71 and the dielectric material coating 72 are also quite thin.

After a roll 70 of coated paper strip 14 has been completed, it is rerolled in a trimming operation which slices off the edges of strip 14 at 75, 76. This trimming at 76 produces a clean exposure of silver-zinc coating 71. Two of such coated and trimmed paper strips are then rolled up together with the uncoated surfaces of the strips in contact with each other as shown in magnified cross-section in Fig. 5. This exposes a clean edge of the metal coating of the upper of the coated paper strips 14 at one end of the lay-up and a clean edge of the metal coating of the lower of the coated paper strips 14 at the other end. The two coated paper strips 14 which are thus laid up back to back are rolled up into a cylinder 80 as shown in Fig. 6. Metal is then coated as by the "Schoop" process onto the ends 81, 82 of cylinder 80 to form a contact with the ends of the zinc coatings to which connecting wires 83, 84 can be attached as shown in Fig. 7.

Another form of product of this invention is shown in magnified cross-section in Fig. 8. To produce capacitors using this form of capacitor strip, the method described above which results in the product of Fig. 4 is used for vaporizing a coating of silver on one side of paper strip 14 with the coating of zinc vaporized onto the coating of silver. The paper strip is then metallized on the reverse side leaving the uncoated margin at the opposite edge of the strip. The metallized paper is then lacquered first on one side, and then on the other by the roller coating process described. The paper strip is then trimmed at edges 90, 91 to form the capacitor strip 92 shown in cross-section in Fig. 8. This capacitor strip is then rolled up, metal terminals are applied and terminal wires are attached to produce the finished product.

Still another form of capacitor produced by this invention is shown in magnified form in Fig. 9. Paper strip 14 is given a first coating of silver, zinc and dielectric material as described above in connection with Fig. 4. Roll 70 of Fig. 3 is then rerolled into another spool in order that the edge of the paper strip to which the zinc coating does not extend will be placed in position on mandrel 13 so that this edge of the paper strip will pass under mask 24. The coated strip can then again be taken through the steps of the coating processes with the apparatus of Fig. 1 and Fig. 3 in the manner that the finished product will have the metal of the first coating extending only to one edge of the paper strip and the metal coating which is applied on top of the first coatings by the second use of the apparatus of Fig. 1 and Fig. 3 will extend only to the other edge of the paper strip. After the roll of paper strip has been passed through the second processing by means of the apparatus of Fig. 1 and Fig. 3 it is again rerolled to reverse the position of the edge of the strip to which the upper metal coating extends. This roll is then ready for a third run through the apparatus of Fig. 1 and Fig. 3 in order to place third coatings of silver, zinc and dielectric material on the strip. Following this, successively, other coatings of silver, zinc and dielectric material are applied in like manner to build up a capacitor structure as shown in Fig. 9, of the desired number of coatings. The edges 94, 95 are then slit off or trimmed to expose a clean edge of the zinc coatings. Fig. 9 shows two metal coatings appearing at each edge of paper strip 14. The coatings of silver, zinc and dielectric material are very thin films and a strip of paper thus coated can be rolled up and metal ends attached to which terminal wire connections can be made. The sequence of operations described may be repeated as often as desired.

Yet another form of product is shown in Fig. 10 in which two similar capacitor strips are placed together but with their like edges at opposite sides of the lay-up. Each of the two capacitor strips has a paper strip 14 with vaporized metal coatings applied thereon and roller coated layers of dielectric material over each of the vaporized coatings and extending from edge to edge of strips 14. These capacitor strips are then trimmed along the edges, rolled up into a cylinder, metal is coated on the cylinder ends and connecting wires 83 and 84 soldered to the ends to make a completed capacitor.

The paper strips in the capacitor of Fig. 10 are excluded from the electrical path, because each strip is embraced by two similarly extended metal coatings which are conductively connected to form one electrode of the finished capacitor. An alternative arrangement is shown in Fig. 11. Here two capacitor strips are laid together ready for rolling up into a capacitor in which the supporting paper strips form no part of the electrical path in the finished capacitor and consequently the electrical quality of the paper strips does not influence that of the capacitor which is entirely dependent upon the properties of the lacquer film. The two strips each have vaporized metal coatings on the two surfaces of each paper strip 14, and there is a coating of dielectric material over one of the metal coatings on each strip. After rolling the two strips into the form of a cylinder, metal is coated as by the "Schoop" process onto the ends of the exposed edges of the metal coatings to which connecting wires 83 and 84 are soldered. Of the adjoined strips, one external surface is lacquer, the other metal.

Still another form of product is shown in cross-sectional view in Fig. 12. In this capacitor strip the coatings are all on one side of paper strip 14. A metal coating 71 is first vaporized on paper strip 14. A coating of dielectric material 72 is then roller coated on over the metal coating 71 and extends from edge to edge of paper strip 14. A second metal coating 71 is vaporized on over the coating of dielectric material 72. The finished strip is trimmed, rolled up into cylindrical form, metal is coated onto the cylinder ends and connecting wires are soldered to the metal ends to make a completed capacitor.

Another modified form of product can be made wherein the paper strip 14 or supporting strip can be separated from the capacitor structure after the capacitor structure has been built up on it. This is done by first applying a coating of a liquefied normally solid dielectric material to the entire bare surface of one side of paper strip 14 as the first step in the process. If polystyrene is used for this first coating of paper strip 14, which is then coated with silver followed by a coating of silver and zinc, and if cellulose acetate is used as the liquefied normally solid dielectric material for the coating which covers the zinc coating, it is possible to dissolve the coating of polystyrene with benzene and thus remove the paper strip from the silver, zinc and cellulose acetate coatings. The resulting product will be a strip made up of coatings as in Fig. 13 which shows the metal coating 71 and cellulose acetate dielectric coating 99 before the polystyrene coating 98 is dissolved by benzene to separate paper strip 14 from its coatings. The capacitor strip after removal of the support strip and ready for capacitor rolling is shown in Fig. 16.

Another form of capacitor strip is made, as shown in Fig. 14, by applying a soluble coating 98 to supporting strip 14; over coating 98 a lacquer coating 72; over coating 72 a vaporized metal coating 71; and finally, a second lacquer coating 72 over the metal coating. The final form of the capacitor strip comprising a deposited metal coating 71 embraced by dielectric lacquer films 72 may be seen in Fig. 17.

Fig. 15 is a schematic showing, in greater detail than Fig. 3, of the driving mechanism controlling the application of the lacquer coating. Motor 129, through gearing generally designated 130, drives in the rotational senses indicated, the rollers 47 and 50 and scraper roller 49.

In the capacitors of Figs. 10 and 11, the electrical properties are completely determined by those of the roller coated dielectric material and are independent of the electrical character of the paper support. The supporting strip in these forms of capacitor may therefore be of any insulating material of sufficient flexibility and tensile strength, a plastic strip for example. The arrangement of metallic coatings, on both faces of the support, electrically joined at one edge to constitute one electrode, the other electrode being similarly constituted, leaves the intermediate strips of paper or other insulating material to serve as a framework only, in which no dielectric losses can occur. Obviously, one may provide on each face of the supporting strip any convenient number of metallic coatings with appropriate lacquer coatings, joining at one edge all the metallic coatings to form a single electrode of the final capacitor.

There have been described three forms of capacitor strips which may be rolled up to form a finished capacitor, of capacitance determined by the length of the strip and by the number of attenuating layers of conducting and insulating coatings. In one form the alternating conducting and insulating coatings are supported by a strip of paper or plastic; in a second form, the support is by an additional insulating coating; the third form is that of Fig. 10 or of Fig. 11, in which the supporting material is excluded from the electrical circuit.

For the sake of simplicity the coatings have been described as formed in separate operations, one that of Fig. 1 for applying the conducting coating, the other that of Fig. 3 for the insulating coating. By obvious expansion of the apparatus used to perform these operations, it will be possible in one operation to apply silver-zinc coatings in vacuum to both sides of the supporting strip and then apply lacquer coatings in air over each metal coating; this requires only provision of additional mandrels to accommodate duplicate silver, zinc and lacquer supplies and to eliminate the end-for-end reversal of roll 15 in going from the apparatus of Fig. 1 to that of Fig. 3. By further mechanical expansion, it is clearly possible to repeat as often as desired the application of alternating layers of metal and of lacquer without removing the strip from the train of apparatus until all coatings have been applied.

It will be understood that in place of zinc any metal of low electrical resistivity, chemically stable and able to withstand the heat of the drying lamps and the expected ambient temperature during use, may be used for the electrodes. Examples of suitable lacquers are polystyrene and cellulose acetate butyrate.

Reference is hereby made to the application Serial No. 316,928 filed October 25, 1952, wherein a related invention is disclosed.

What is claimed is:

1. A capacitor strip comprising a substantially impervious self-suportable film of cellulose acetate less than 0.3 mil in thickness, a coating of silver of extreme thinness on the major portion of one side of said film, a coating of conducting material adhering only to the coating of silver, said coatings comprising a continuous electrode between 100 and 10,000 A. units in thickness, said coating of silver constituting a minor portion of the thickness of said electrode and a severable carrier web comprising a support strip and a coating of polystyrene bonding the support strip to said electrode-coated film of cellulose acetate.

2. A capacitor strip in accordance with claim 1 wherein said conducting material is zinc.

3. A capacitor strip consisting of a substantially impervious self-supportable film of cellulose acetate, said film being less than 0.3 mil in thickness, a coating of silver of extreme thinness on the major portion of one side of said film, and a coating of zinc adhering only to the coating of silver, said coatings of silver and conducting material forming a continuous electrode in the order of between 100 and 10,000 Å. units in thickness supported by said film, said coating of silver comprising a minor portion of the thickness of said electrode.

References Cited in the file of this patent

UNITED STATES PATENTS

| | | |
|---|---|---|
| 1,239,953 | Perry | Sept. 11, 1917 |
| 1,281,108 | Vaughn | Oct. 8, 1918 |
| 1,479,315 | Pickard | Jan. 1, 1924 |
| 1,784,611 | Palanyi | Dec. 9, 1930 |
| 1,838,073 | Harvey | Dec. 22, 1931 |
| 1,857,476 | Reynolds | May 10, 1932 |
| 1,909,079 | Steerup | May 16, 1933 |
| 1,921,086 | MacDonald | Aug. 8, 1933 |
| 2,125,341 | Hall et al. | Aug. 2, 1938 |
| 2,203,283 | Miller | June 4, 1940 |
| 2,281,602 | Ruben | May 5, 1942 |
| 2,367,152 | Strab | Jan. 9, 1945 |
| 2,492,166 | Marco | Dec. 27, 1949 |
| 2,614,524 | Haynes | Oct. 21, 1952 |

FOREIGN PATENTS

| | | |
|---|---|---|
| 562,821 | Great Britain | July 18, 1944 |
| 618,934 | Great Britain | Mar. 1, 1949 |
| 619,364 | Great Britain | Mar. 8, 1949 |